(12) United States Patent
Lee

(10) Patent No.: US 10,368,355 B2
(45) Date of Patent: Jul. 30, 2019

(54) METHOD AND APPARATUS FOR OPERATION OF MULTI-SIM DEVICE

(71) Applicant: Samsung Electronics Co., Ltd., Gyeonggi-do (KR)

(72) Inventor: Jun-Kyoung Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 79 days.

(21) Appl. No.: 15/490,389

(22) Filed: Apr. 18, 2017

(65) Prior Publication Data

US 2017/0359813 A1  Dec. 14, 2017

Related U.S. Application Data

(63) Continuation-in-part of application No. 15/343,745, filed on Nov. 4, 2016, now Pat. No. 9,872,239.

(30) Foreign Application Priority Data

Jun. 14, 2016 (KR) .................. 10-2016-0074060
Sep. 19, 2016 (KR) .................. 10-2016-0119252

(51) Int. Cl.
*H04W 72/04* (2009.01)
*H04W 52/02* (2009.01)
*H04W 72/08* (2009.01)
*H04W 68/02* (2009.01)
*H04W 88/06* (2009.01)

(52) U.S. Cl.
CPC ..... *H04W 72/048* (2013.01); *H04W 52/0212* (2013.01); *H04W 52/0216* (2013.01); *H04W 68/02* (2013.01); *H04W 72/0453* (2013.01); *H04W 72/085* (2013.01); *H04W 88/06* (2013.01); *Y02D 70/00* (2018.01); *Y02D 70/1262* (2018.01); *Y02D 70/24* (2018.01)

(58) Field of Classification Search
None
See application file for complete search history.

(56) References Cited

U.S. PATENT DOCUMENTS

| 8,626,179 B2 | 1/2014 | Ngai |
| 8,787,262 B2 | 7/2014 | Dhanda |
| 9,119,172 B2 | 8/2015 | Ponukumati |
| 9,408,183 B2 | 8/2016 | Chirayll |
| 2012/0231802 A1* | 9/2012 | Ngai ................. H04W 72/1215 455/450 |
| 2013/0225211 A1 | 8/2013 | Lebreton et al. |

(Continued)

OTHER PUBLICATIONS

U.S. Office Action dated May 15, 2017 issued in counterpart U.S. Appl. No. 15/343,745, 17 pages.

*Primary Examiner* — Mohamed A Kamara
*Assistant Examiner* — Saad Khawar
(74) *Attorney, Agent, or Firm* — The Farrell Law Firm, P.C.

(57) ABSTRACT

Method, device, and chip for allocating radio frequency (RF) resources by a multi-subscriber identification module (SIM) including at least a first SIM and a second SIM. The method includes determining a frequency of RF resource allocation to the second SIM based on at least one of a data communication state of the first SIM in a connected mode and a received signal state of the second SIM in an idle state, and allocating the RF resources to the second SIM based on the frequency of the RF resource allocation.

20 Claims, 10 Drawing Sheets

DETERMINE FREQUENCY OF RF RESOURCE ALLOCATION TO THE SECOND SIM BASED ON AT LEAST ONE OF A DATA COMMUNICATION STATE OF THE FIRST SIM AND A RECEIVED SIGNAL STATE OF THE SECOND SIM —1110

ALLOCATE RF RESOURCES TO THE SECOND SIM BASED ON THE FREQUENCY OF THE RF RESOURCE ALLOCATION —1120

(56) References Cited

U.S. PATENT DOCUMENTS

| | | | |
|---|---|---|---|
| 2014/0247813 A1* | 9/2014 | Henneberg Rysgaard | ................... H04W 72/12 370/336 |
| 2015/0141006 A1* | 5/2015 | Walke | ..................... H04W 8/18 455/434 |
| 2015/0163827 A1 | 6/2015 | Ekici | |
| 2015/0296520 A1 | 10/2015 | Batchu et al. | |
| 2015/0304989 A1* | 10/2015 | Zhu | ................... H04W 36/0066 370/252 |
| 2015/0373671 A1* | 12/2015 | Yang | ..................... H04W 72/02 455/450 |
| 2016/0174207 A1* | 6/2016 | Belleschi | .............. H04L 1/1822 455/450 |
| 2016/0269938 A1* | 9/2016 | Krishnamoorthy | ..... H04W 8/18 |
| 2017/0034723 A1* | 2/2017 | Anand | .............. H04W 36/0088 |

* cited by examiner

METHOD AND APPARATUS FOR OPERATION OF MULTI-SIM DEVICE

PRIORITY

This application is a continuation-in-part application of U.S. patent application Ser. No. 15/343,745, filed in the U.S. Patent and Trademark Office on Nov. 4, 2016, which claimed priority under 35 U.S.C. § 119(a) to a Korean Patent Application filed on Jun. 14, 2016 in the Korean Intellectual Property Office and assigned Serial No. 10-2016-0074060, and to a Korean Patent Application filed on Sep. 19, 2016 in the Korean Intellectual Property Office and assigned Serial No. 10-2016-0119252, the contents of each of which are incorporated herein by reference.

BACKGROUND

1. Field of the Disclosure

The present disclosure relates generally to a method and an apparatus for a multi-subscriber identification module (SIM) device, and more particularly, to a method and an apparatus for allocating radio frequency (RF) resources to multiple SIMs in a multi-SIM device for each SIM to receive paging messages.

2. Description of the Related Art

Terminals that communicate with other devices through wireless signals, for example, laptop computers, personal digital assistants (PDAs), mobile or cellular phones, and other devices are widely used, and use various channels for different operation modes. It has become increasingly important to reserve and allocate network resources, such as bandwidth, for consumers who use power-intensive/communication-intensive applications that are executed in the terminals and require continuous network access. If terminals have limited power (for example, when using a rechargeable battery pack), the terminals, accordingly, may operate in various modes in order to extend the operation life of the terminal.

For example, operation modes for a terminal may include a "connected" mode and an "idle" mode. In the connected mode, the terminal may actively exchange data (for example, voice or data calls or sessions) with one or more access nodes (for example, base stations, a node B, a femto cell, and the like) within a wireless communication system. In the idle mode, a client terminal may monitor control channels, such as a paging channel (PCH), to receive any paging messages directed to the client terminal. A paging message may warn the terminal of an incoming voice or data call. In response to such a paging signal, the terminal switches from the idle mode to the connected mode in order to receive the incoming voice or data call.

Power consumption of the terminal in the idle mode is lower than power consumption in the connected mode. However, the terminal still consumes power to monitor the paging channel while in the idle mode. In order to reduce power consumption in the idle mode, terminals operate in a discontinuous reception (DRX) mode, in which the terminal periodically monitors the paging channel instead of continuously monitoring the paging channel, thereby reducing power consumption. In the DRX mode, the terminal is either in a lower power or "sleep" state or a higher power or "wake-up" state. The terminal wakes up to monitor and process the paging channel to receive any paging messages and, if there is no request for additional communication, the terminal switches from the "wake-up" state to the "sleep" state. The "sleep" state and the "wake-up" state repeat according to a predetermined period. One "DRX cycle" refers to one period of the "sleep" and "wake-up" states.

Originally, a SIM was used to identify a single user of a terminal by a network, and was manufactured in a card type and inserted into a terminal. If a user of a terminal is changed to a new user but the same SIM remains inserted into the terminal, the network still identifies the user of the terminal as the old user, instead of the new user.

Now, some terminals include two or more SIMs. A terminal including two or more SIMs may be referred to as a dual-SIM terminal or a multi-SIM terminal. A network recognizes each of the operations of a plurality of SIMs included in a single terminal as an individual user operation and each of the plurality of SIMs may access different individual networks or base stations.

SIMs in a multi-SIM terminal share RF resources of the terminal such as circuit(s), transmit/receive path(s), and other hardware and/or software resources used for processing transmitted/received signals. Some multi-SIM terminals have a plurality of RF resources to allow the plurality of SIMs to simultaneously communicate, and some multi-SIM terminals allocate RF resources to one of a plurality of SIMs at a time; that is, only one SIM is allowed to communicate in an allocated time period.

However, sharing RF resources may cause collisions, e.g., a time period allocated to more than one SIM. For example, as discussed above, each of the SIMs repeats a sleep and a wake-up DRX cycle. If the same RF resources are allocated to two or more SIMs, a collision between RF resource allocations is generated if the SIMs enter the wake up state at the same time. If such a collision is generated, at least one SIM cannot monitor the paging channel and, accordingly, misses its paging signal transmitted from a base station. Typically, in response to such a collision, the base station repeatedly transmits the paging signal. However, if a particular SIM has successive collisions and cannot receive the RF resources continuously, the SIM will miss all the repeatedly transmitted paging signals and, accordingly, may miss an incoming data or voice call.

Accordingly, methods, devices, and systems are required to efficiently allocate RF resources of a multi-SIM terminal between the SIMs installed in the multi-SIM device to receive their respective paging messages.

In addition, if one SIM of the multi-SIM terminal operates in a connected mode and another SIM operates in an idle mode, the SIM in the idle mode may periodically receive RF resources for operations in a periodic wake-up interval. If the SIM in the connected mode continuously transmits and receives a large amount of data to and from a serving base station, the data transmission and reception of a SIM in the connected mode may stop due to the periodic RF resource allocation to the SIM in the idle mode and, accordingly, the SIM in the connected mode may not be guaranteed sufficient throughput. Therefore, it is required to improve throughput of a SIM in a connected mode while guaranteeing a minimum call performance of a SIM in an idle mode of a multi-SIM terminal.

SUMMARY

An aspect of the present disclosure provides a method of efficiently allocating RF resources between SIMs in a multi-SIM device to receive their respective paging messages.

Another aspect of the present disclosure provides a multi-SIM device for efficiently allocating RF resources between SIMs in a multi-SIM device to receive their respective paging messages.

Another aspect of the present disclosure provides an integrated circuit or chip for efficiently allocating RF resources between SIMs in a multi-SIM device to receive their respective paging messages.

Another aspect of the present disclosure provides an RF resource allocation method which may improve throughput of a SIM in a connected mode while guaranteeing a minimum call performance of a SIM in an idle mode in a multi-SIM device.

Another aspect of the present disclosure provides a multi-SIM device which may improve throughput of a SIM in a connected mode while guaranteeing a minimum call performance of a SIM in an idle mode.

Another aspect of the present disclosure provides a chip for controlling a multi-SIM device that may improve throughput of a SIM in a connected mode while guaranteeing a minimum call performance of a SIM in an idle mode.

According to an aspect of the present disclosure, a method of allocating RF resources by a multi-SIM device including at least a first SIM and a second SIM is provided. The method includes determining a frequency of RF resource allocation to the second SIM based on at least one of a data communication state of the first SIM in a connected mode and a received signal state of the second SIM in an idle state; and allocating the RF resources to the second SIM based on the frequency of the RF resource allocation.

According to another aspect of the present disclosure, a multi-SIM device including at least a first SIM and a second SIM is provided. The multi-SIM device includes a transceiver; and a processor connected to the transceiver, wherein the processor is configured to determine a frequency of RF resource allocation to the second SIM based on at least one of a data communication state of the first SIM in a connected mode and a received signal state of the second SIM in an idle state; and allocate the RF resources to the second SIM based on the frequency of the RF resource allocation.

According to another aspect of the present disclosure, a chip for controlling a multi-SIM device including at least a first SIM and a second SIM is provided. The chip is configured to determine a frequency of RF resource allocation to the second SIM based on at least one of a data communication state of the first SIM in a connected mode and a received signal state of the second SIM in an idle state; and allocate the RF resources to the second SIM based on the frequency of the RF resource allocation.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

The advantages and features of the present disclosure will become apparent by referring to embodiments of the present disclosure as described below in detail in conjunction with the accompanying drawings. However, the present disclosure is not intended to be limited to the embodiments set forth below, but may be implemented in various different forms, as one of ordinary skill in the art would know. The following embodiments are provided only to inform those skilled in the art of the scope of the present disclosure as defined by the appended claims, and their equivalents.

Although the terms "first" and "second" are used to describe various elements, these terms are used merely to distinguish one element from another element. Accordingly, a first element described below may be designated a second element within the scope of the present disclosure.

Figure 1:
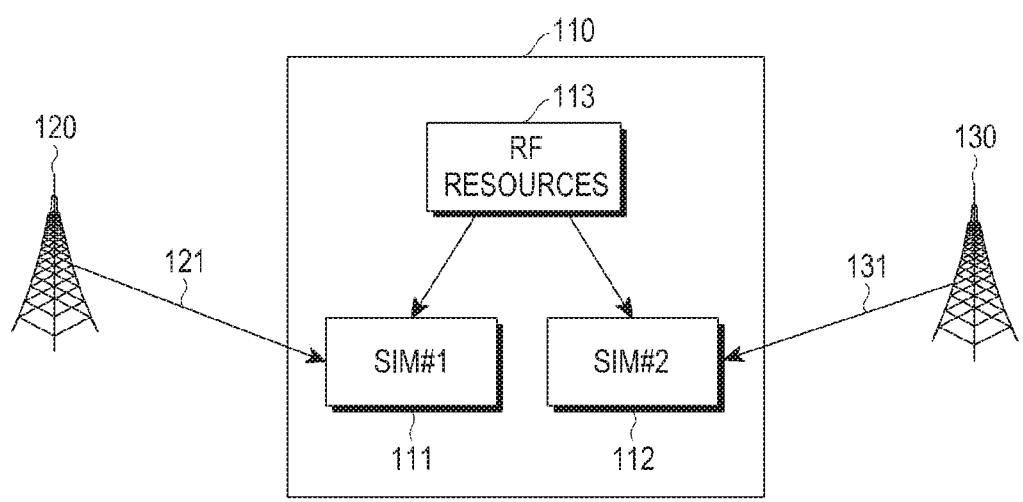
FIG. 1 illustrates an example of communications between first and second base stations and a multi-SIM device.

FIG. 1 illustrates an example of communications between first and second base stations 120 and 130 and a multi-SIM device 110. The multi-SIM device 110 may be referred to as, for example, a multi-SIM terminal, a multi-SIM user equipment (UE), or a multi-SIM mobile station.

Referring to FIG. 1, the multi-SIM device 110 includes SIM#1 111, SIM#2 112, and RF resources 113. Although the multi-SIM device 110 in FIG. 1 includes only two SIMs, a multi-SIM device according to the present disclosure may include more SIMs, and methods and apparatuses of the present disclosure may be applied to a multi-SIM device having three or more SIMs.

The RF resources 113 may include a circuit, a path for transmitting or receiving a signal, and/or tangible or intangible (e.g. hardware or software) resources for processing transmitted/received signals. The RF resources 113 may be shared by SIM#1 111 and SIM#2 112. The RF resources 113 may be allocated to one of SIM#1 111 and SIM#2 112 for only one communication (transmission/reception). Each of SIM#1 111 and SIM#2 112 must be allocated the RF resources 113 to communicate with an external device. For example, if the RF resources 113 are allocated to SIM#1 111, SIM#1 111 may communicate with the first base station 120, which is the serving base station of SIM#1 111, and SIM#2 112 cannot communicate with the second base station 130, which is the serving base station of SIM#2 112.

SIM#1 111 and SIM#2 112 each repeats a sequence of a sleep period and a wake-up period according to a corresponding DRX cycle. In a wake-up period, SIM#1 111 monitors a paging channel for a paging message 121 transmitted from the first base station 120. Likewise, in a wake-up period, SIM#2 112 monitors a paging channel for a paging message 131 transmitted from the second base station 130. In this case, the paging messages 121 and 131 refer to messages that warn SIM#1 111 and SIM#2 112, respectively, of an incoming voice or data call. Ideally, in each wake-up period of SIM#1 111, the RF resources 113 should be allocated to SIM#1 111 and, similarly, in each wake-up period of SIM#2 112, the RF resources 113 should be allocated to SIM#2 112.

However, SIM#1 111 and SIM#2 112 may each simultaneously enter the wake-up period, which may be referred to as a collision of the allocation of the RF resources 113. Hereinafter, an example of a collision of the allocation of the RF resources is described in more detail with reference to FIG. 2.

Figure 2:
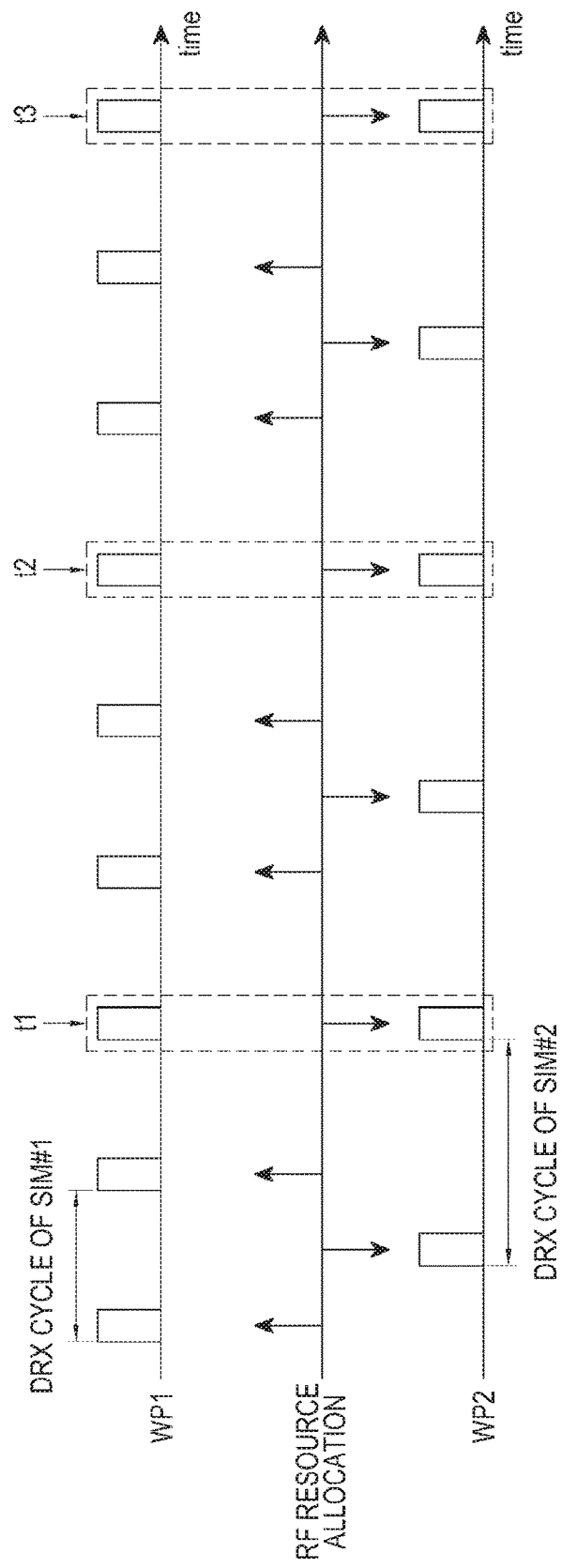
FIG. 2 illustrates an example of a collision between RF resource allocations to two different SIMs in a multi-SIM device.

FIG. 2 illustrates an example of collisions of RF resources allocated to multiple SIMs in a multi-SIM terminal.

Referring to FIG. 2, a wake-up pattern WP1 of SIM#1 periodically repeats a DRX cycle of SIM#1 and a wake-up pattern WP2 of SIM#2 periodically repeats a DRX cycle of SIM#2. Although the DRX cycles of SIM#1 and SIM#2 are different from each other, FIG. 2 is only an example, and the DRX cycles of SIM#1 and SIM#2 may be the same as each other according to some embodiments. The RF resources are allocated to SIM#1 as shown by the wake-up pattern WP1, and the RF resources are allocated to SIM#2 as shown by the wake-up pattern WP2.

However, since the wake-up periods of pattern WP1 of SIM#1 and the wake-up periods of pattern WP2 of SIM#2 temporally overlap each other at times t1, t2, and t3, there are collisions of the allocation of RF resources at the times t1, t2, and t3, which causes various possible problems.

For example, the first base station 120 in FIG. 1 may repeatedly transmit the paging message 121 to SIM#1 111 at the collision times t1, t2, and t3, if the resources are allocated to SIM#2 112, resulting in SIM#1 111 missing all of the repeated transmissions of the paging message 121 until finally receiving the repeated transmission after a delay. In this case, SIM#1 111 may recognize the existence of the incoming data or voice call late and thus the incoming data or voice reception may be delayed, or may not recognize the existence of the data or voice call at all and thus never receive the data or voice call.

Accordingly, an efficient RF resource allocation method that addresses these issues according to an embodiment of the present disclosure is described below with reference to FIG. 3.

Figure 3:
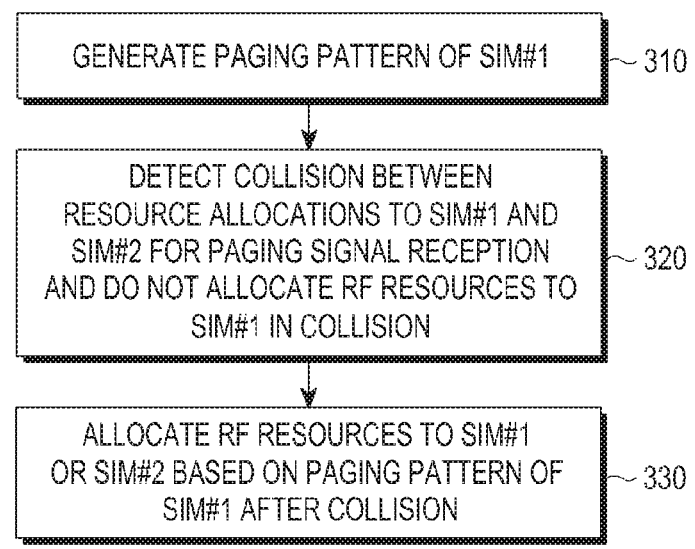
FIG. 3 is a flowchart of a method of allocating RF resources to SIMs in a multi-SIM device for receiving paging messages according to an embodiment of the present disclosure.

FIG. 3 is a flowchart of a method of allocating RF resources to SIMs in a multi-SIM device for receiving paging messages according to an embodiment of the present disclosure.

Referring to FIG. 3, the method of allocating RF resources to SIMs (in this example, SIM#1 and SIM#2) to receive paging messages according to an embodiment of the present disclosure includes generating a paging pattern of SIM#1 in step 310, detecting a collision between RF resource allocations to SIM#1 and SIM#2 to receive paging signals in step 320, wherein the resources are not allocated to SIM#1 during the collision, and, after the collision, allocating the RF resources to SIM#1 or SIM#2 based on the paging pattern of SIM#1 in step 330.

In step 310, the multi-SIM device generates a paging pattern of SIM#1. The paging pattern of SIM#1 indicates the opportunities of SIM#1 to receive the paging signal of SIM#1. The paging pattern may be generated by performing an OR operation on one or more sub-paging patterns. The sub-paging pattern may be generated based on sequences of received paging messages. For example, a base station may transmit sequences of paging messages according to a predetermined rule. The rule for transmitting the sequences of the paging messages may indicate the period of time between transmissions of the paging messages and a number of repeated transmissions of the paging messages. The rule for transmitting the sequences of the paging messages may be different depending on, for example, a base station or equipment used for a network. Accordingly, different SIMs in a multi-SIM terminal may experience sequences of paging messages of more than one type. According to the sequences of the paging messages of one or more types, the multi-SIM device generates and stores one or more sub-paging patterns. Table 1 below shows information for sub-paging patterns stored in a multi-SIM device.

TABLE 1

| MCC | MNC | Sub-paging Pattern Index | Time | RAT | Paging Number | Intervals between paging signals |
| --- | --- | --- | --- | --- | --- | --- |
| 450 | 06 | 1 | Feb. 16, 2016 | LTE | 4 | 4 sec-3 sec-2 sec |
| 450 | 06 | 2 | Mar. 2, 2016 | LTE | 3 | 3 sec-4 sec |
| ... |

Each row in Table 1 above corresponds to a sub-paging pattern. In Table 1 above, through a combination of a mobile country code (MCC) and a mobile network code (MNC), a mobile network operator or a public land mobile network (PLMN) may be identified. Sub-paging patterns of the same MCC and MNC network may be used by one SIM using the corresponding mobile network operator/PLMN. The "Sub-paging Pattern index" indicates an index of the sub-paging pattern. "Time" indicates when the sub-paging pattern was determined/measured or stored. The "RAT" indicates the type of radio access technology/protocols (RAT) provided by the network corresponding to the indicated MCC/MNC and may be, for example, long term evolution (LTE), code division multiple access (CDMA), or global system for mobile communication (GSM). The "Paging Number" indicates the number of paging signals in a sequence of paging signals of the sub-paging pattern. "Intervals between paging signals" indicates the time intervals between the transmissions of the paging signals in the sequence of the sub-paging pattern.

In order to generate a paging pattern for a SIM, a multi-SIM device according to an embodiment of the present disclosure recognizes sub-paging patterns which have the same MCC and MNC as the PLMN/mobile network operator that currently serves the SIM and then performs an OR operation on the recognized sub-paging patterns to generate the paging pattern for the SIM.

Figure 4:
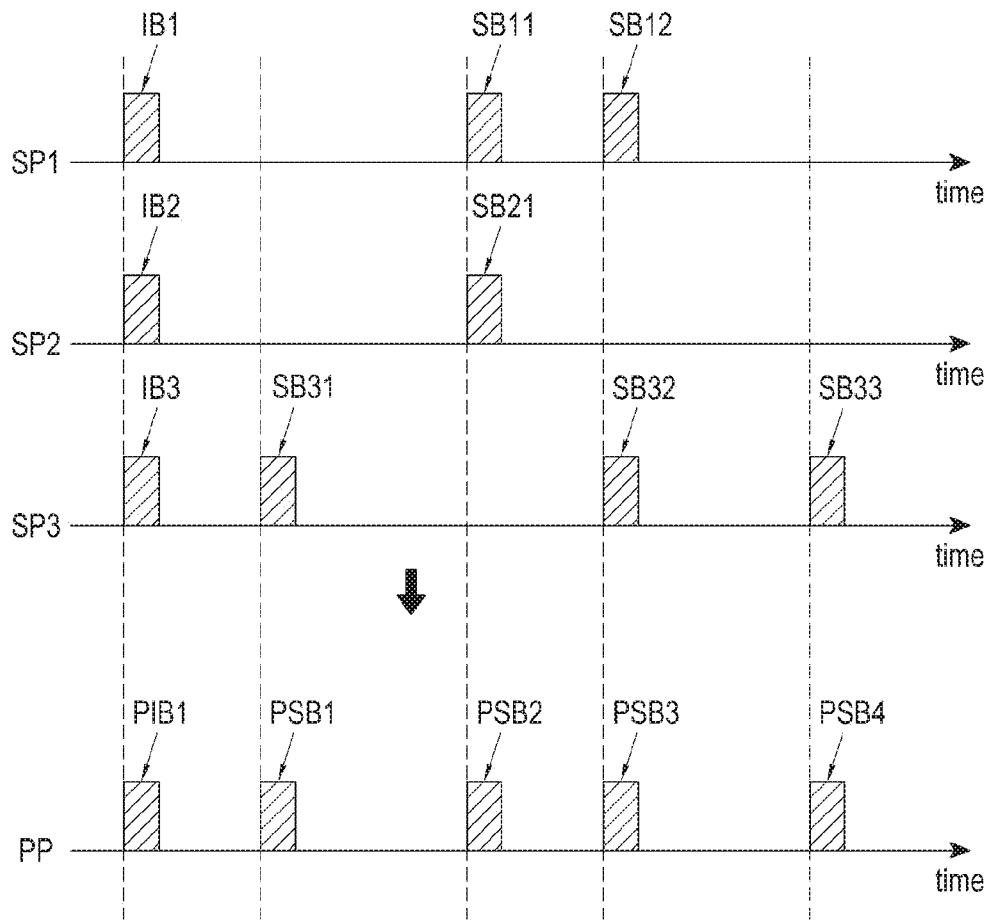
FIG. 4 illustrates generating paging patterns according to an embodiment of the present disclosure.

FIG. 4 illustrates generating paging patterns from more than one sub-paging pattern according to an embodiment of the present disclosure.

Referring to FIG. 4, sub-paging patterns SP1, SP2, and SP3 correspond to a visualization of information on the transmission of paging signals indicated by "Paging Number" and "Intervals between paging signals" in a table (e.g.

Table 1 above). Each of the sub-paging patterns SP1, SP2, and SP3 includes an initial paging block (IB) and one or more subsequent paging blocks (SBs) indicating transmission time points of the paging signals. For example, the first sub-paging pattern SP1 includes the initial paging block IB1 indicating the paging signal initially transmitted in the sequence of paging signals and subsequently transmitted paging blocks SB11 and SB12.

As shown in FIG. 4, paging pattern PP is generated by performing an OR operation on the sub-paging patterns SP1, SP2, and SP3. In the OR operation, the sub-paging patterns SP1, SP2, and SP3 are arranged or, equivalently, lined up, based on their initial paging blocks IB1, IB2, and IB3. The paging pattern PP resulting from the OR operation may be understood as indicating the transmission opportunities of all paging signals included in each of the sub-paging patterns SP1, SP2, and SP3. The paging pattern PP includes an initial paging block PIB1 and one or more subsequent paging blocks (e.g., PSB1, PSB2, PSB3, and PSB4).

Referring to FIG. 3, in step 320, the multi-SIM device detects a collision between the RF resource allocations for SIM#1 and SIM#2 to receive their respective paging signals, wherein the RF resources are not allocated to SIM#1 during the collision period. For example, in step 320, the collision between the generated RF resource allocations, i.e., between WP1 and WP2, at the time t1 of FIG. 2 may be detected.

In step 330, the multi-SIM device allocates the RF resources to SIM#1 or SIM#2 based on the paging pattern of SIM#1 after the collision. An example of this operation is described in detail below with reference to FIG. 5.

Figure 5:
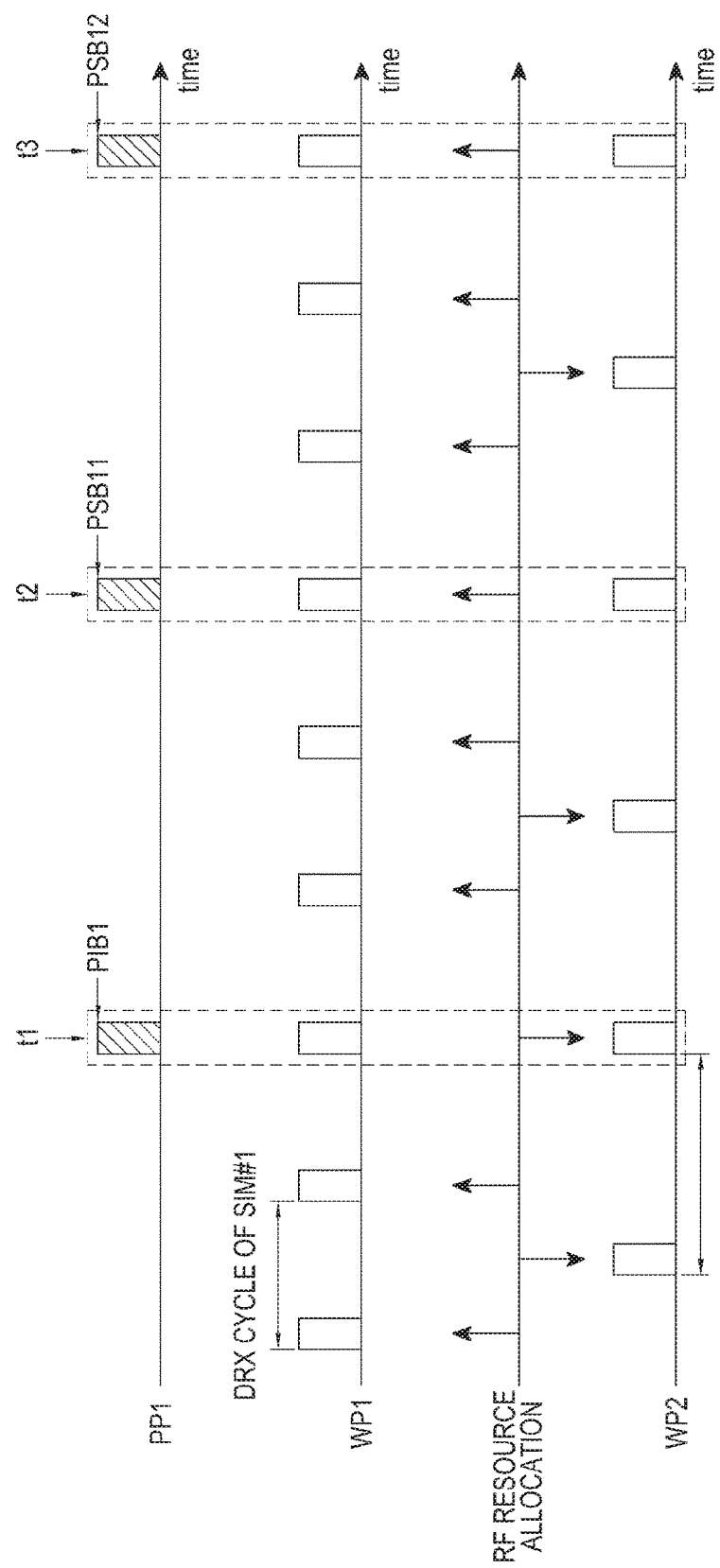
FIG. 5 illustrates allocating RF resources according to an embodiment of the present disclosure.

FIG. 5 illustrates allocating RF resources based on a paging pattern according to an embodiment of the present disclosure. In FIG. 5, a paging pattern PP1 of SIM#1 may be generated according to the method shown by the example described above with reference to FIG. 4. Wake-up pattern WP1 of SIM#1 and wake-up pattern WP2 of SIM#2 may be the same as those described above with reference to FIG. 2.

Referring to FIG. 5, after the detected collision time t1 where the RF resources are allocated to SIM#2, the RF resources are allocated to SIM#1 based on the paging pattern PP1. In paging pattern PP1, an initial paging block PIB1 corresponds to the detected collision time t1 and the RF resources may be first allocated to SIM#1 at time t2 and/or t3 of subsequent paging blocks PSB11 and PSB22, respectively. Although the times t2 and t3 in FIG. 5 of the subsequent paging blocks PSB11 and PSB22, respectively, are also times if there are collisions between allocations of the RF resources, the present disclosure is not intended to be limited thereto. If there were no collision between the allocations of the RF resources at either of time t2 and time t3 of the subsequent paging blocks PSB11 and PSB22, respectively, the RF resources would remain allocated to SIM#1 at the corresponding time. Since the paging pattern PP1 indicates all reception opportunities of the paging signals of SIM#1, even though the paging signal transmitted to SIM#1 is not received at the collision time t1, it is possible to guarantee the rapid reception of the paging signal in subsequently repeated transmissions of the paging signal by the RF resource allocation method according to the present disclosure, as shown by the example described above with reference to FIG. 5.

Hereinafter, an RF resource allocation method, if there are collisions between generated paging patterns, is described with reference to FIGS. 6 and 7.

Figure 6:
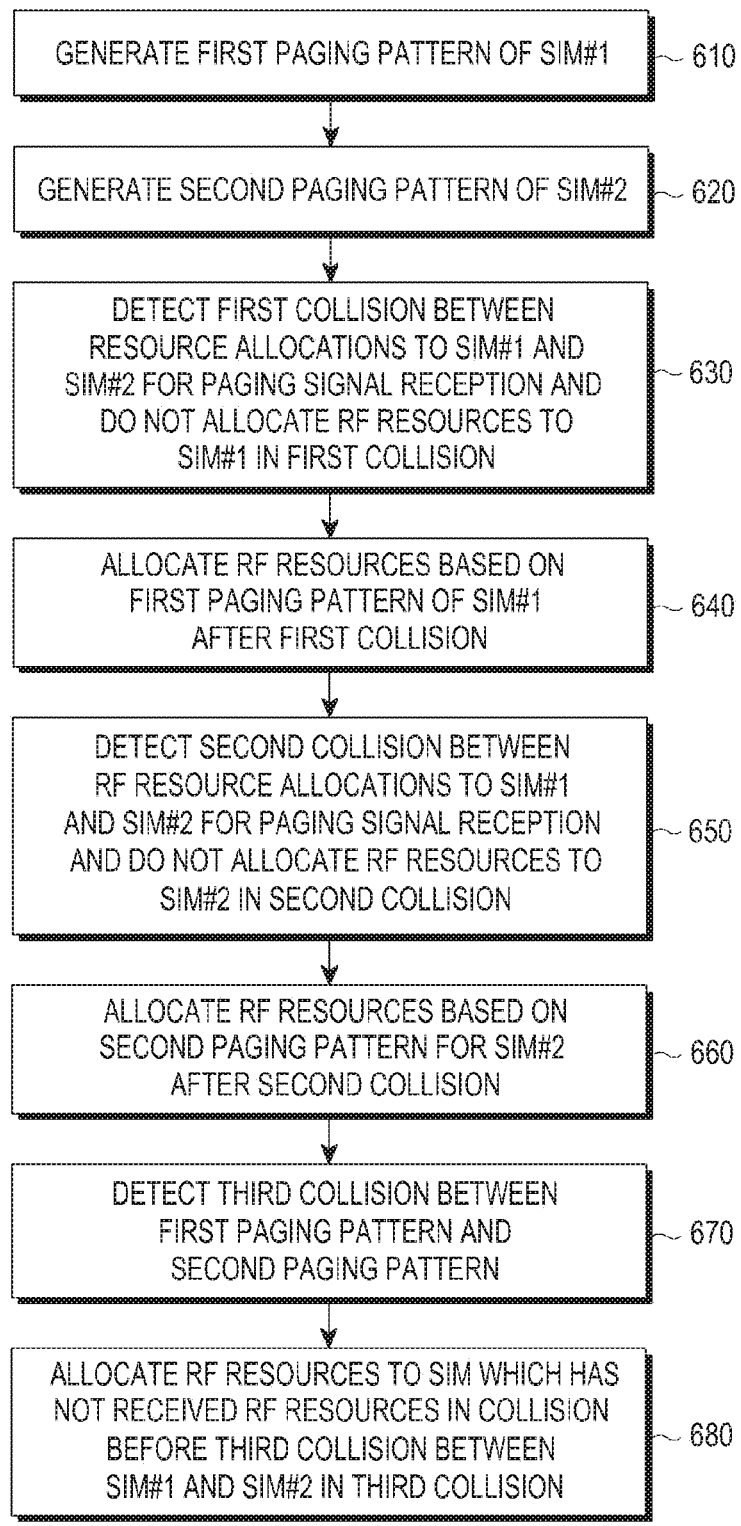
FIG. 6 is a flowchart of a method of allocating RF resources to multiple SIMs in a multi-SIM device according to an embodiment of the present disclosure.

FIG. 6 is a flowchart of a method of allocating RF resources to multiple SIMs in a multi-SIM device if there are collisions between paging patterns according to an embodiment of the present disclosure. FIG. 7 illustrates allocating RF resources to multiple SIMs in a multi-SIM device according to an embodiment of the present disclosure if there are collisions between paging patterns according to an embodiment of the present disclosure. In FIG. 7, the pertinent details about paging pattern PP1, wake-up pattern WP1, and wake-up pattern WP2 are substantially the same as the description of the same elements described above with reference to FIGS. 2 and 5.

Referring to FIG. 6, in step 610, the multi-SIM device generates a first paging pattern PP1 of SIM#1. The first paging pattern PP1 of SIM#1 may be generated by substantially the same operation as the paging pattern was generated in step 310 of FIG. 3.

In step 620 of FIG. 6, the multi-SIM device generates a second paging pattern PP2 of SIM#2. The second paging pattern PP2 of SIM#2 may be generated by substantially the same operation as that used for generating the first paging pattern PP1.

Figure 7:
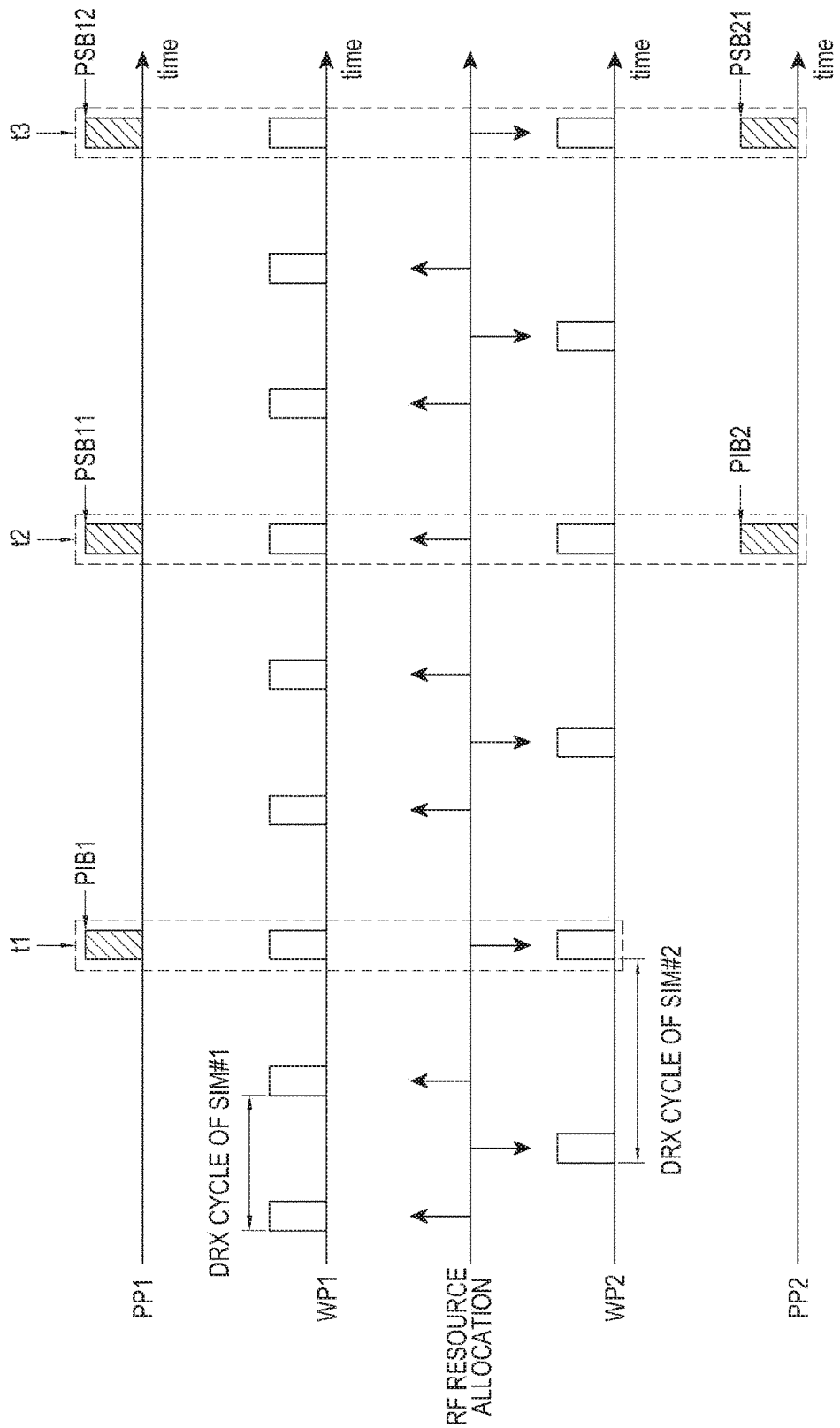
FIG. 7 illustrates allocating RF resources to multiple SIMs in a multi-SIM device according to an embodiment of the present disclosure.

In step 630, the multi-SIM device detects a first collision between the RF resource allocations of SIM#1 and SIM#2 for receiving the paging signal—i.e., in the example of FIG. 7, the collision between WP1 and WP2 at time t1 is detected. In the first collision, the resources are not allocated to SIM#1.

In step 640, the multi-SIM device allocates the RF resources based on the first paging pattern PP1 of SIM#1 after the first collision. The method of allocating the RF resources based on the first paging pattern PP1 in step 640 may be substantially the same as the method of allocating the RF resources based on the paging pattern described in step 330 of FIG. 3.

In step 650 of FIG. 6, the multi-SIM device detects a second collision between the RF resource allocations for SIM#1 and SIM#2 to receive their paging signals—i.e., in the example of FIG. 7, the collision between WP1 and WP2, respectively, at time t2 is detected. In the second collision, the resources are not allocated to SIM#2.

In step 660, the multi-SIM device allocates the RF resources based on the second paging pattern PP2 of SIM#2 after the second collision. In order to guarantee the reception of the paging signal of SIM#2 after time t2 of the second collision, the RF resources are first allocated to SIM#2 based on the second paging pattern PP2.

Referring to FIG. 7, the paging pattern PP2 of SIM#2 includes an initial paging block PIB2 and a subsequent paging block PSB21. The initial paging block PIB2 corresponds to the second collision time t2 where the RF resources are not allocated to SIM#2. After the second collision time t2, the RF resources are first allocated to SIM#2, that is, in subsequent paging block PSB21.

In step 670 in FIG. 6, the multi-SIM device detects a third collision between the first paging pattern PP1 and the second paging pattern PP2. Referring to FIG. 7, the initial paging block PIB1 may correspond to the first collision time t1, the arranged first paging pattern PP1 and the initial paging block PIB2 may correspond to the second collision time t2, and the arranged second paging pattern PP2 may collide at the third collision time t3. According to steps 640 and 660 in FIG. 6, a collision between RF resource allocations to SIM#1 and SIM#2 may be generated at the third collision time t3.

In step 680, in order to resolve the collision between the RF resource allocations at the third collision time t3, the multi-SIM device allocates the RF resources to the SIM which did not receive the RF resources in the previous collision. That is, the resources may be allocated to SIM#2 112, which has not received the RF resources at the second collision time t2 corresponding to a collision time before the third collision time t3. Through such a scheme, the RF resources may be equally allocated to SIM#1 and SIM#2 regardless of the relative priorities of the RF resource allocation to SIM#1 based on the first paging pattern PP1 and the RF resource allocation to SIM#2 based on the second paging pattern PP2.

Below, methods for initiating an update and updating the paging pattern of a SIM in a multi-SIM device according to an embodiment of the present disclosure is described with reference to FIGS. 8 and 9, respectively.

Figure 8:
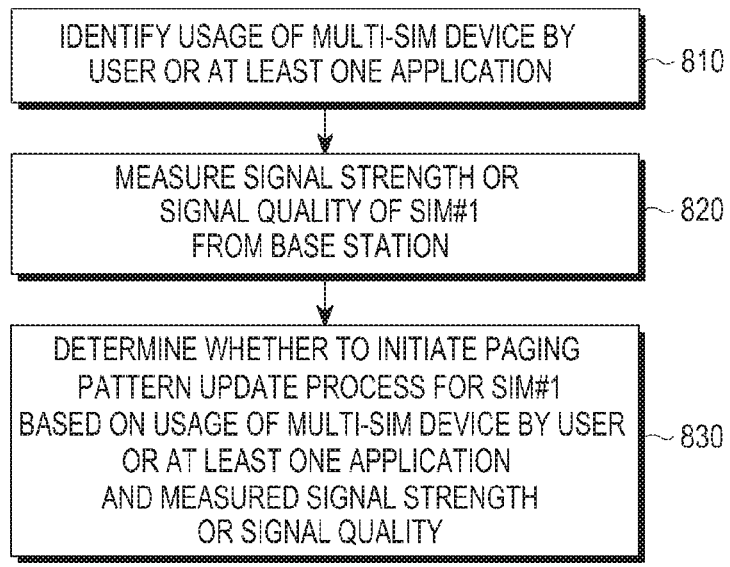
FIG. 8 is a flowchart of a method of initiating a paging pattern update process for a SIM in a multi-SIM device according to an embodiment of the present disclosure.

FIG. 8 is a flowchart of a method of initiating a paging pattern update process for a SIM in a multi-SIM device according to an embodiment of the present disclosure.

Referring to FIG. 8, in step 810, the multi-SIM device may identify the usage of the multi-SIM device by a user or at least one application. Through step 810, the multi-SIM device may determine whether the paging pattern update process may be performed without disturbing the user or the at least one application.

In step 820, the multi-SIM device measures a signal strength or a signal quality of the signal for the SIM, e.g., SIM#1, from the base station. For example, the multi-SIM device may measure reference signal received power (RSRP) and/or reference signal received quality (RSRQ) of the base station serving the SIM to be updated. Through step 820, the multi-SIM device may determine whether the paging signal may be stably received in the paging pattern update process.

In step 830, the multi-SIM device determines whether to initiate the process for updating the paging pattern of the SIM (e.g., SIM#1) based on the identification of the usage of the multi-SIM device by the user or at least one application in step 810 and the signal strength or signal quality measured in step 820. More specifically, for example, if the multi-SIM device determines that the current usage of the multi-SIM device is small enough to perform the paging pattern update process without being disturbed and determines that the measured signal strength and/or signal quality is good enough to guarantee a stable reception of the paging signal, the multi-SIM device may determine to initiate the paging pattern update process FIG. 9 is a flowchart of a method of updating the paging pattern of a SIM in a multi-SIM device according to an embodiment of the present disclosure.

Figure 9:
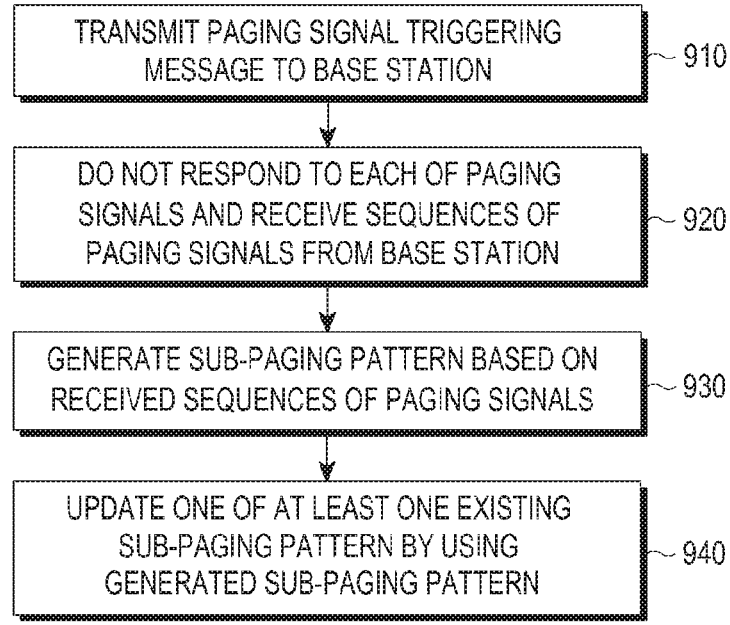
FIG. 9 is a flowchart of a method of updating a paging pattern of a SIM in a multi-SIM device according to an embodiment of the present disclosure.

Referring to FIG. 9, in step 910, the multi-SIM device transmits a message to a base station for triggering the base station to transmit a paging signal. More specifically, the multi-SIM device transmits a paging signal triggering message to a serving base station of the SIM to be updated (e.g., SIM#1).

In step 920, the multi-SIM device receives sequences of paging signals from the base station in response to the paging signal triggering message. The base station stops transmission of any additional paging signals if the multi-SIM device responds to the received sequences of paging signals. Therefore, in order to receive the sequences of the intact paging signals, the multi-SIM device may not respond to each of the paging signals received while the sequences of the paging signals are received.

In step 930, the multi-SIM device generates a sub-paging pattern based on the received sequences of the paging signals.

In step 940, the multi-SIM device updates one of at least one existing paging pattern of the SIM to be updated (e.g., SIM#1) based on the generated sub-paging pattern. More specifically, the multi-SIM device acquires MCC and MNC information by decoding the received paging signal, and determines if any of the existing sub-paging patterns have an MCC and an MNC that match the MCC and MNC acquired from the decoded paging signal. If there is an existing sub-paging pattern having an MCC and an MNC that are the same as the MCC and the MNC, respectively, acquired from the received paging signal that matches the sub-paging pattern generated in step 930, the multi-SIM device updates only the "time" of the corresponding existing sub-paging pattern to be the current time or the reception time of the sequences of the paging signals received in the paging pattern update process.

If there is no existing sub-paging pattern having an MCC and an MNC that matches the sub-paging pattern generated in step 930 and the number of stored sub-paging patterns is smaller than the number of paging patterns that may be stored in the multi-SIM device, the multi-SIM device stores the sub-paging pattern generated in step 930 as an additional existing sub-paging pattern. If there is no existing sub-paging pattern having an MCC and an MNC that matches the sub-paging pattern generated in step 930 and the number of stored sub-paging patterns is less than or equal to the number of paging patterns that may be stored in the multi-SIM device, the multi-SIM device replaces the existing sub-paging pattern having the oldest "time" with the sub-paging pattern generated in step 930.

According to an embodiment of the present disclosure, the sub-paging patterns of individual SIMs in a multi-SIM device may be stored separately or may not be updated. For example, a multi-SIM device may generate the paging pattern of SIM#1 from the sub-paging patterns having MCCs and MNCs that match the MCC and MNC of the serving PLMN of SIM#1 and also generate the paging pattern of SIM#2 in the same way. For example, the sub-paging patterns of SIM#1 and the sub-paging patterns of SIM#2 may not be stored separately if SIM#1 and SIM#2 are served by the same PLMN, thereby reducing the amount of memory usage in the multi-SIM device.

Hereinafter, an RF resource allocation method to improve throughput in a multi-SIM device is described below with reference to FIGS. 10 and 11.

Figure 10:
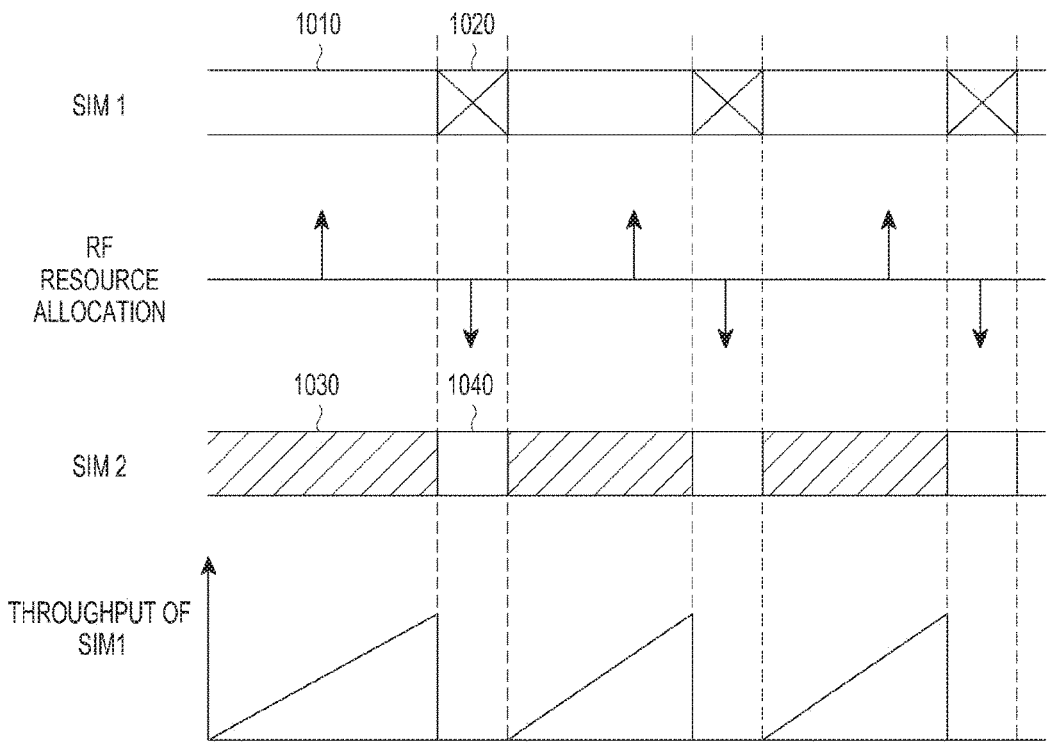
FIG. 10 illustrates throughput of a SIM according to RF resource allocation.

FIG. 10 illustrates throughput of a SIM (e.g., SIM#1) according to RF resource allocation.

Referring to FIG. 10, SIM#1 may be in a connected mode, and SIM#2 may be in an idle mode. SIM#2 operating in the idle mode may repeat a sleep interval 1030 and a wake-up interval 1040 on a predetermined period. In the sleep interval 1030, SIM#2 may operate with minimum functions to save power and may not perform an operation that requires RF resources. The RF resources may be allocated to SIM#1 while SIM#2 is in the sleep interval 1030. In the wake-up interval 1040, SIM#2 may perform operations such as receiving a paging signal, measuring a cell, searching for a cell, and reading a broadcast channel (BCH). SIM#2 in the wake-up interval 1040 may need the RF resources to perform such operations, and the RF resources may be allocated to SIM#2 in the wake-up interval 1040. According to an embodiment of the present disclosure, the RF resources may not be allocated to SIM#2 throughout the wake-up interval 1040. If the operations that require the RF resources end, the RF resources may be allocated to SIM#1 in the wake-up interval 1040.

According to the operation of SIM#2, SIM#1 may repeat a first interval 1010 in which the RF resources are allocated and a second interval 1020 in which the RF resources are not allocated. In general, if the terminal (or a SIM) desires to continuously transmit/receive a particular amount of data to/from the base station, throughput of the terminal may continuously increase until throughput reaches a particular maximum value from a time if the transmission/reception with the base station starts. However, as illustrated in FIG. 10, due to the periodic allocation of the RF resources to SIM#2 in the idle mode, throughput of SIM#1 increasing in the first interval 1010 cannot reach the maximum and may drop to zero in the second interval 1020. Accordingly, the throughput efficiency of SIM#1 operating in the connected mode while SIMI#2 operates in the idle mode may deteriorate. According to an embodiment of the present disclosure, it is possible to improve throughput of SIM#1 while maintaining call performance of SIM#2 by controlling a frequency of the allocation of the RF resources to SIM#2. This is described below in more detail with reference to FIG. 11.

Figure 11:
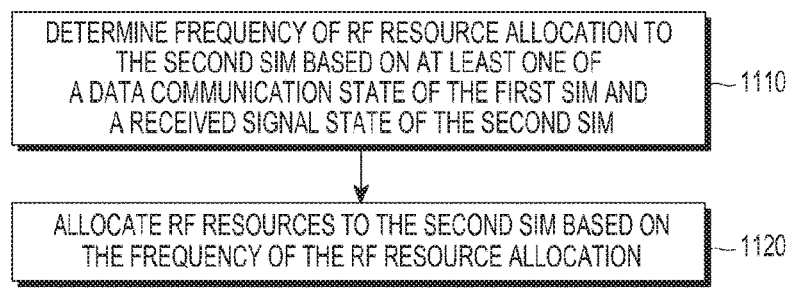
FIG. 11 is a flowchart of a method of allocating RF resources according to an embodiment of the present disclosure.

FIG. 11 is a flowchart of a method of allocating RF resources according to an embodiment of the present disclosure.

Referring to FIG. 11, in step 1110, a multi-SIM device may determine a frequency of the allocation of RF resources to SIM#2 based on at least one of a data communication state of SIM#1 and a received signal state of SIM#2. In this case, SIM#1 may be in a connected mode and SIM#2 may be in an idle mode. The communication state of SIM#1 may refer to a data transmission or reception state of SIM#1 during a particular previous time. As the communication state of SIM#1 shows more data transmission or reception during the particular previous time, the multi-SIM device may decrease the frequency of the allocation of the RF resources to SIM#2. If SIM#1 continuously transmits or receives a significant amount of data, it may be estimated that SIM#1 requires significant throughput in the future. In this case, throughput of SIM#1 may be increased by decreasing the frequency of the allocation of the RF resources to SIM#2 and thus reducing the stoppage of the RF resource allocation to SIM#1

The communication state of SIM#1 may include at least one of the throughput of SIM#1 and a communication duration time of SIM#1. Throughput of SIM#1 may be determined based on an amount of data transmitted or received by SIM#1 during a predetermined previous period of time. As throughput of SIM#1 increases, the frequency of the allocation of the RF resources to SIM#2 may decrease. The communication duration time of SIM#1 may be determined based on a period of time during which SIM#1 continuously transmits or receives data greater than or equal to a threshold value. As the communication duration time of SIM#1 increases, the frequency of the allocation of the RF resources to SIM#2 may decrease. More specifically, if the throughput of SIM#1 increases and the communication duration time of SIM#1 increases, the multi-SIM device may determine the frequency of the allocation of the RF resources to SIMI#2, which was conventionally initially set as a first value, as a second value that is less than the first value.

The received signal state of SIM#2 may indicate a state of a signal (for example, a reference signal) received from a serving base station of SIM#2. The received signal state of SIM#2 may include one or more of a signal strength and a signal quality (for example, SNR or SINR) of a reference signal received by SIM#2 from the serving base station of SIM#2. If the received signal state of SIM#2 is good, it may take relatively less time to measure and search for a cell in the wake-up interval. Accordingly, even though the RF resources are allocated to SIM#2 during the wake-up interval, SIM#2 may return the RF resources to SIM#1 in a short time. In contrast, if the received signal state of SIM#2 is bad, it may take more time to measure and search for a cell in the wake-up interval. If the received signal state of SIM#2 is very bad, measuring and searching for a cell may be useless. According to an embodiment of the present disclosure, in consideration of such matters, if the received signal quality of SIM#2 is better (that is, the signal strength of the reference signal is higher or the signal quality of the reference signal is better), the frequency of the allocation of the RF resources to SIM#2 may increase. More specifically, if the received signal state of SIM#2 improves, the multi-SIM device may determine the frequency of allocation of the RF resources to SIM#2, which was initially set as a first value, as a second value greater than the first value.

According to an embodiment of the present disclosure, the frequency of the allocation of the RF resources to SIM#2 may be determined as a value greater than or equal to the lowest value to maintain the minimum performance of SIM#2. The frequency of the allocation of the RF resources to SIM#2 may be determined as a value less than or equal to the highest value of SIM#1. The highest value may be determined in consideration of a maximum requirement value of the RF resources of SIM#2 in the idle mode or an RF resource requirement value to maintain the minimum perform of SIM#1. The frequency of the allocation of the RF resources to SIM#2 may be determined within a range between the highest value and the lowest value.

In step 1120, the multi-SIM device may allocate the RF resource to SIM#2 based on the frequency of the allocation of the RF resources determined in step 1110. According to an embodiment of the present disclosure, the multi-SIM device may randomly allocate the RF resources, and a probability of the allocation of the RF resources to SIM#2 may be determined according to the frequency of the allocation of the RF resources. For example, if the frequency of the allocation of the RF resources increases, the probability of the allocation of the RF resources to SIM#2 may increase. Even if the frequency of the allocation of the RF resources to SIM#2 decreases and thus SIM#2 does not receive a paging signal initially transmitted from a serving base station, a probability that SIM#2 does not receive all the paging signals repeatedly re-transmitted in the future may be significantly reduced due to the random allocation of the RF resources to SIM#2. The multi-SIM device may periodically allocate the RF resources to SIM#2 and the period on which the RF resources are allocated to SIM#2 may be determined according to the frequency of the allocation of the RF resources. For example, the period on which the RF resources are allocated to SIM#2 may decrease as the frequency of the allocation of the RF resources increases.

According to an embodiment of the present disclosure, the operations of the multi-SIM device described above with reference to FIG. 11 may be independently performed by the device regardless of an instruction from a base station or settings.

Figure 12:
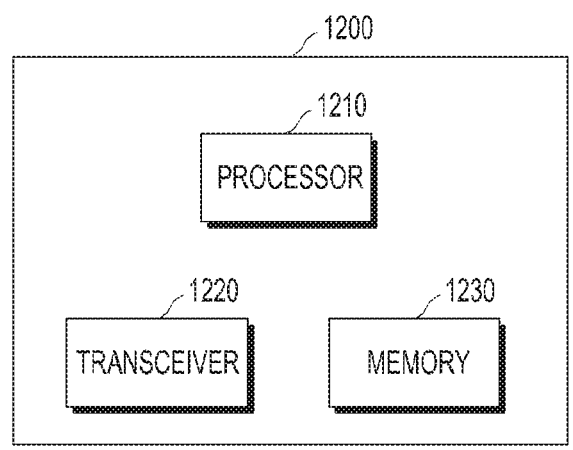
FIG. 12 is a block diagram of a multi-SIM device according to an embodiment of the present disclosure.

FIG. 12 is a block diagram of a multi-SIM device 1200 according to an embodiment of the present disclosure.

Referring to FIG. 12, the multi-SIM device 1200 may perform the operations described above with reference FIGS. 1 through 11. The multi-SIM device 1200 includes a transceiver 1220, a memory 1230, and a processor 1210 that is electrically coupled to, and may communicate with, the transceiver 1220 and the memory 1230. The multi-SIM device 1200 transmits signals, receives signals, and communicates with other entities through the transceiver 1220. The memory 1230 stores information for, inter alia, the operations of the multi-SIM device 1200. For example, the aforementioned sub-paging patterns and instructions or codes for controlling the processor 1210 to perform one or more operations may be stored in the memory 1230. The processor 1210 may control the operations of the multi-SIM device 1200. The operations of the multi-SIM device described above with reference to FIGS. 1 through 11 may be processed and executed substantially by the processor 1210. Although transmission and reception of signals are performed by the transceiver 1220 and storage of the sub-paging patterns is performed by the memory 1230, those operations of the transceiver 1220 and the memory 1230 may be controlled by the processor 1210. In this manner, the transmission and the reception of signals and the storage of sub-paging patterns may also be considered to be performed by the processor 1210 and may be referred to in the present disclosure as such.

At least some of the multi-SIM device 1200 may be implemented as a chip or a chip set. For example, each of the processor 1210, the transceiver 1220, and the memory 1230 may be implemented as a single chip, at least some of the processor 1210, the transceiver 1220, and the memory 1230 may be implemented as one integrated chip, or at least some of the processor 1210, the transceiver 1220, and the memory 1230 may be implemented on separate chips.

Those skilled in the art will recognize that various logic blocks, modules, circuits, methods, and algorithms described in connection with the examples disclosed herein may be implemented as electronic hardware, computer software, or a combination thereof. Recognizing the interchangeability of hardware and/or software in terms of functionality, various components, blocks, modules, circuits, and the like have been generally described herein in terms of the functionality thereof. Whether such functionality is implemented in hardware and/or software depends on the specific application and design limitations imposed on the total system. Those skilled in the art may use a variety of ways to realize the described functionalities for each specific application, and such realizations are intended to be within the scope of the present disclosure as defined in the appended claims, and their equivalents.

The various illustrative logic blocks, modules, circuits, and functions described in connection with the embodiments disclosed herein may be implemented using, for example, the following components: a general-purpose processor, a digital signal processor (DSP), an application specific integrated circuit (ASIC), a field programmable gate array (FPGA) or other programmable logic device, discrete gate or transistor logic, discrete hardware components, or any combination of these components. The general-purpose processor may be a microprocessor or, alternatively, the processor may be any general processor, controller, microcontroller, or processing device acting as a state machine. The processor may also be a combination of computing devices, for example, a combination of DSP and microprocessor, multiple microprocessors, one or more microprocessors combined with a DSP core, or any other such configurations.

As described above, any methods or algorithms described in connection with the embodiments disclosed herein may be implemented in hardware, in software, or in any combination thereof. The software may be stored in a random access memory (RAM), a flash memory, a read only memory (ROM), an erasable programmable ROM (EPROM), an electrically erasable programmable ROM (EEPROM), registers, a hard disc, a removable disc, a compact disc (CD)-ROM, or any known storage medium having appropriate capabilities, as would be understood by one of ordinary skill in the art. Any such storage medium is coupled to at least one processor which may read information from the storage medium and write information to the storage medium. Alternatively, the storage medium may be integrated into the processor. For example, the processor and the storage medium may reside within an ASIC.

As described above, the functions described herein may be implemented in hardware, software, firmware, or any combination of thereof. If the functions are implemented in software, the functions may be stored as one or more instructions or codes in a non-transitory computer-readable recording medium. The non-transitory computer-readable recording medium may easily transfer a computer program from one place to another place and may be accessed by a general-purpose or special-purpose computer. For example, and not intended for limitation, such a non-transitory computer-readable recording medium may include a RAM, a ROM, an EEPROM, a CD-ROM, a laser disk, a digital versatile disk (DVD), a Blu-ray disk or other optical disk storage, a floppy disk or any other magnetic storage devices, or other media that may be used to store desired program code in the form of instructions or data structures and that may be accessed by a general-purpose or special-purpose computer or a general-purpose or special-purpose processor. Further, a non-transitory computer-readable recording medium may have a predetermined access means. For example, if software is transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of a non-transitory computer-readable recording medium. Combinations of any of the above are also intended to be included within the scope of non-transitory computer-readable recording medium.

While embodiments of the present disclosure have been described with reference to the accompanying drawings, it will be understood by those of ordinary skill in the art that certain implementations may be varied and modified without departing from the scope of the present disclosure. Accordingly, it is intended to be understood that the embodiments described above are merely examples for purposes of description and are not intended to limit the present disclosure. The scope of the present disclosure is defined by the appended claims and their equivalents.

What is claimed is:

1. A method of allocating radio frequency (RF) resources by a multi-subscriber identification module (SIM) device including at least a first SIM and a second SIM, the method comprising:
   determining a frequency of performing RF resource allocation to the second SIM based on a data communication state of the first SIM and a received signal state of the second SIM; and
   allocating the RF resources to the second SIM based on the frequency of performing the RF resource allocation,
   wherein the first SIM is in a connected mode, and
   wherein the second SIM is in an idle state.

2. The method of claim 1, wherein the data communication state of the first SIM includes at least one of throughput of the first SIM and a communication duration time of the first SIM.

3. The method of claim 2, wherein determining the frequency of performing the RF resource allocation to the second SIM comprises:
   determining the frequency of performing the RF resource allocation as a first value; and if the throughput of the first SIM increases, determining the frequency of performing the RF resource allocation as a second value less than the first value.

4. The method of claim 2, wherein determining the frequency of performing the RF resource allocation to the second SIM comprises:
    determining the frequency of performing the RF resource allocation as a first value; and
    if the data communication duration time of the first SIM increases, determining the frequency of performing the RF resource allocation as a second value less than the first value.

5. The method of claim 2, wherein the throughput of the first SIM is determined based on an amount of data transmitted or received by the first SIM during a predetermined previous period of time.

6. The method of claim 2, wherein the data communication duration time of the first SIM is determined based on a period of time during which the first SIM continuously transmits or receives an amount of data greater than or equal to a threshold value.

7. The method of claim 1, wherein the received signal state of the second SIM is determined based on at least one of a strength and a quality of a reference signal received by the second SIM from a serving base station.

8. The method of claim 1, wherein determining the frequency of performing the RF resource allocation to the second SIM comprises:
    determining the frequency of performing the RF resource allocation as a first value; and
    if the received signal state of the second SIM improves, determining the frequency of performing the RF resource allocation as a second value greater than the first value.

9. The method of claim 1, wherein allocating the RF resources to the second SIM comprises randomly allocating the RF resources to the second SIM according to a probability determined based on the frequency of performing the RF resource allocation.

10. The method of claim 1, wherein allocating the RF resources to the second SIM comprises periodically allocating the RF resources to the second SIM according to a period determined based on the frequency of performing the RF resource allocation.

11. A multi-subscriber identification module (SIM) device including at least a first SIM and a second SIM, the multi-SIM device comprising:
    a transceiver; and
    a processor connected to the transceiver,
    wherein the processor is configured to:
        determine a frequency of performing RF resource allocation to the second SIM based on a data communication state of the first SIM and a received signal state of the second SIM; and
        allocate the RF resources to the second SIM based on the frequency of performing the RF resource allocation,
    wherein the first SIM is in a connected mode, and
    wherein the second SIM is in an idle state.

12. The multi-SIM device of claim 11, wherein the data communication state of the first SIM includes at least one of throughput of the first SIM and a data communication duration time of the first SIM.

13. The multi-SIM device of claim 12, wherein the throughput of the first SIM is determined based on an amount of data transmitted or received by the first SIM during a predetermined previous period of time, and the processor is further configured to:
    determine the frequency of performing the RF resource allocation as a first value; and
    if the throughput of the first SIM increases, determine the frequency of performing the RF resource allocation to the second SIM based on a determination of the frequency of performing the RF resource allocation as a second value less than the first value.

14. The multi-SIM device of claim 12, wherein the data communication duration time of the first SIM is determined based on a period of time during which the first SIM continuously transmits or receives data greater than or equal to a threshold value, and the processor is further configured to:
    determine the frequency of performing the RF resource allocation to the second SIM as a first value; and
    if the data communication duration time of the first SIM increases, determine the frequency of performing the RF resource allocation to the second SIM based on a determination of the frequency of performing the RF resource allocation as a second value less than the first value.

15. The multi-SIM device of claim 11, wherein the processor is further configured to randomly allocate the RF resources to the second SIM according to a probability determined based on the frequency of performing the RF resource allocation.

16. A chip for controlling a multi-subscriber identification module (SIM) device including at least a first SIM and a second SIM, the chip configured to:
    determine a frequency of performing RF resource allocation to the second SIM based on a data communication state of the first SIM and a received signal state of the second SIM; and
    allocate the RF resources to the second SIM based on the frequency of performing the RF resource allocation,
    wherein the first SIM is in a connected mode, and
    wherein the second SIM is in an idle state.

17. The chip of claim 16, wherein the data communication state of the first SIM includes at least one of throughput of the first SIM and a data communication duration time of the first SIM.

18. The chip of claim 17, wherein the throughput of the first SIM is determined based on an amount of data transmitted or received by the first SIM during a predetermined previous period of time, and the chip is further configured to:
    determine the frequency of performing the RF resource allocation as a first value; and
    if the throughput of the first SIM increases, determine the frequency of performing the RF resource allocation to the second SIM based on a determination of the frequency of performing the RF resource allocation as a second value less than the first value.

19. The chip of claim 17, wherein the data communication duration time of the first SIM is determined based on a period of time during which the first SIM continuously transmits or receives an amount of data greater than or equal to a threshold value, and the chip is further configured to:
    determine the frequency of performing the RF resource allocation as a first value; and
    if the data communication duration time of the first SIM increases, determine the frequency of performing the RF resource allocation to the second SIM based on a determination of the frequency of performing the RF resource allocation as a second value less than the first value.

20. The chip of claim 16, wherein the chip is further configured to randomly allocate the RF resources to the second SIM according to a probability determined based on the frequency of performing the RF resource allocation.

\* \* \* \* \*